United States Patent

[11] 3,607,728

| [72] | Inventor | Frederick C. Wilhelm |
| | | Arlington Heights, Ill. |
| [21] | Appl. No. | 846,622 |
| [22] | Filed | July 31, 1969 |
| [45] | Patented | Sept. 21, 1971 |
| [73] | Assignee | Universal Oil Products Company |
| | | Des Plaines, Ill. |
| | | Continuation-in-part of application Ser. No. 835,218, June 20, 1969. |

[54] HYDROGEN-CONSUMING PROCESS AND CATALYST THEREFOR
9 Claims, No Drawings

[52] U.S. Cl..................................................... 208/111,
252/461, 252/472, 208/57, 208/89, 208/217, 260/667
[51] Int. Cl........................................................ C10g 13/02
[50] Field of Search............................................ 208/111;
252/455 Z, 461, 472

[56] References Cited
UNITED STATES PATENTS

| 2,914,464 | 11/1959 | Burton et al................ | 208/138 |
| 3,098,030 | 7/1963 | Coonradt et al............ | 208/111 |
| 3,431,218 | 3/1969 | Plank et al.................. | 252/455 |

Primary Examiner—Delbert E. Gantz
Assistant Examiner—R. M. Bruskin
Attorneys—James R. Hoatson, Jr. and Robert W. Erickson

ABSTRACT: A hydrocarbon hydroprocess utilizing a catalytic composite of a porous carrier material, a Group VIII noble metal component and a lead component, in which process there is effected a chemical consumption of hydrogen. A specific example of one such catalyst is a composite of a crystalline aluminosilicate, a platinum component and a lead component, for utilization in a hydrocracking process. Other hydrocarbon hydroprocesses are directed toward the hydrogenation of aromatic nuclei, the ring-opening of cyclic hydrocarbons, desulfurization, denitrification, hydrogenation, etc. The catalyst contains 0.01 percent to about 2.0 percent by weight of the noble metal component, and the atomic ratio of lead to noble metal is in the range of 0.05:1 to 0.9:1.

HYDROGEN-CONSUMING PROCESS AND CATALYST THEREFOR

RELATED APPLICATION

The present application is a continuation-in-part of my copending application, Ser. No. 835,218 filed June 20, 1969, all the teachings of which are incorporated herein by specific reference thereto.

The present invention involves the use of a catalytic composite of a porous carrier material, a Group VIII noble metal component and a lead component in the hydrotreating of hydrocarbons and mixtures of hydrocarbons, in which composite, the amount of the noble metal component is greater than the lead component. As utilized herein, the term "hydrotreating" is intended to be synonymous with the term "hydroprocessing," and involves the conversion of hydrocarbons at operating conditions selected to effect a chemical consumption of hydrogen. Processes intended to be encompassed by the term "hydroprocessing" include hydrocracking, aromatic hydrogenation, ring-opening, hydrorefining (for nitrogen removal and olefin saturation), improvement of kerosene fractions for jet fuel production, desulfurization (often included in hydrorefining) and hydrogenation, etc. As will be readily recognized, one common attribute of these processes, and the reactions being effected therein, is that they are all "hydrogen-consuming"; they are, therefore, exothermic in nature. The individual characteristics of the foregoing hydrotreating processes, including preferred operating conditions and techniques, will be hereinafter described in greater detail.

The subject of the present invention involves the use of a catalytic composite which has exceptional activity and resistance to deactivation when employed in a hydrogen-consuming process. Such processes require a catalyst having both a hydrogenation function and a cracking function. More specifically, the present process uses a dual function catalytic composite which affords substantial improvements in those hydroprocesses that have traditionally used a dual function catalyst. The catalytic composite constitutes a porous carrier material, a Group VIII noble metal component and a lead component; specifically, an improved hydrocracking process utilizes a crystalline aluminosilicate carrier material, a platinum or palladium component and a lead component for improved activity, product selectivity and operational stability characteristics. Considering that lead has been traditionally thought of, and taught to be a poison for noble metal-containing catalysts, the results achieved are strikingly surprising.

Composites having dual function (cracking-hydrogenation) catalytic activity are widely employed in many industries, particularly the petroleum and petrochemical, for the purpose of accelerating a multitude of hydrocarbon conversion reactions. Generally, the cracking function is thought to be associated with an acid-acting material of the porous, adsorptive refractory inorganic oxide type which is utilized as the carrier material for one or more metallic components from the metals, or compounds of metals, of Groups V through VIII of the Periodic Table, to which the hydrogenation function is generally attributed.

Such catalytic composites serve to promote a wide variety of hydrocarbon conversion reactions such as hydrocracking, isomerization, dehydrogenation, hydrogenation, desulfurization, catalytic reforming, ring-opening, cyclization, aromatization, alkylation, and transalkylation, polymerization, cracking, etc., some of which reactions are hydrogen-producing while others are hydrogen consuming. In using the term "hydrogen-consuming," I intend to exclude those processes wherein hydrogen consumption primarily involves the saturation of light olefins, resulting from undesirable cracking, thereby producing light paraffins, methane, ethane, and propane. In many instances, the commercial application of these catalysts resides in processes where more that one of these reactions proceed simultaneously. An example of this type of process is a hydrocracking process wherein catalysts are utilized to effect selective hydrogenation and cracking of high molecular weight materials to produce a lower-boiling, more valuable hydrocarbon product. Another such example would be the conversion of aromatic hydrocarbons, via ring opening, into jet fuel components, principally straight, or slightly branched paraffins.

Regardless of the reaction involved, or the particular process, it is very important that the catalyst exhibit not only the capability to perform its specified functions initially, but also to perform them satisfactorily for prolonged periods of time. The analytical terms employed in the art to measure how efficient a particular catalyst performs its intended function, in a particular hydrocarbon conversion process, are activity, selectivity and stability. These terms are conveniently defined herein, for a given charge stock, as follows: (1) activity is a measure of the ability of the catalyst to convert a hydrocarbon feed stock into products at a specified severity level, where severity level alludes to the operating conditions employed—the temperature, pressure, liquid hourly space velocity and hydrogen concentration; (2) selectivity refers to the weight percent or volume percent of the reactants that are converted into the desired product and/or products; (3) stability connotes the rate of change of the activity and selectivity parameters with time—obviously, the smaller rate implying the more stable catalyst. With respect to a hydrogen-consuming process, for example hydrocracking, activity, stability and selectivity are similarly defined. Thus, "activity" connotes the quantity of charge stock, boiling above a given temperature, which is converted to hydrocarbons boiling below the given temperature. "Selectivity" refers to the quantity of converted charge stock which boils below the desired end point of the product, as well as above a minimum specified initial boiling point. "Stability" connotes the rate of change of activity and stability. Thus, for example, where a gas oil, boiling above about 650° F., is subjected to hydrocracking, "activity" connotes the conversion of 650° F., plus charge stock to 650° F., minus product. "Selectivity" can, for example, allude to the quantity of conversion into gasoline boiling range hydrocarbons—i.e., pentanes and heavier, normally liquid hydrocarbons boiling up to about 400° F. "Stability" might be conveniently expressed in terms of temperature increase required during various increments of catalyst life, in order to maintain the desired activity.

As is well known to those skilled in the art, the principal cause of observed deactivation or instability of a dual function catalyst is associated with the fact that coke forms on the surface of the catalyst during the course of the reaction. More specifically, in the various hydrocarbon conversion processes, and especially those which are categorized as hydrogen-consuming, the operating conditions utilized result in the formation of high molecular weight, solid or semisolid, hydrogen-poor carbonaceous material which coats the surface of the catalyst and reduces its activity by shielding its active sites from the reactants. Accordingly, a major problem facing workers in this area of the art is the development of more active and selective catalytic composites which are not as sensitive to the presence of these carbonaceous materials and/or have the capability to suppress the rate of formation of these materials at the operating conditions employed in a particular process.

I have now found a dual function catalytic composite which possesses improved activity, selectivity and stability when employed in the hydroprocessing of hydrocarbons. In particular, I have found that the use of a catalytic composite of a Group VIII noble metal component and a lead component with a porous carrier material improves the overall operation of these hydrogen-consuming processes. As hereafter set forth, the respective amounts and distribution of the catalytic components must be carefully controlled. Moreover, I have determined that a catalytic composite of a crystalline aluminosilicate carrier material, a platinum component and a lead component. When utilized in a process for hydrocracking hydrocarbonaceous material into lower-boiling hydrocarbon products, affords substantial improvement in performances and results. The present invention essentially involves the use of a catalyst in which a lead component has been added to a noble metal-containing, dual function conversion catalyst, and enables the performance characteristics of the process to be sharply and materially improved.

Since the earliest introduction of catalysts containing a Group VIII noble metal component, it has been axiomatic that the effect of lead is extremely detrimental. This concept has become so fixed and certain in the art that tremendous efforts have been devoted to removing lead contaminants from charge stocks that are to be processed in a unit containing a Group VIII noble metal catalyst. In addition, the art is replete with the significant number of methods for reactivating such a catalyst once it has been deactivated by contact with lead or compounds of lead. In sharp contrast to this historic teaching of the art that lead is detrimental to a Group VIII noble metal catalyst, I have now discovered that the presence of lead can be very beneficial. One essential condition associated with the acquisition of the beneficial interaction of lead with a Group VIII noble metal is the atomic ratio of lead to noble metal contained in the composite; my findings here indicate that it is only when this ratio is less than 1:1 that the beneficial interaction of lead is obtained. Another condition for achieving a beneficial interaction of lead with a Group VIII noble metal is the distribution of both the lead and noble metal components on the carrier material with which they are combined; my findings here is that it is essential that both of these components be uniformly dispersed throughout the porous carrier material. A catalyst meeting both of these essential limitations differs sharply from the lead-contaminated catalyst of the prior art. The prime reason for this is that the lead-contaminated catalyst inevitably possesses a high concentration of lead of the surface thereof, since the lead component is acquired from contact with the charge stock typically containing an organic or inorganic lead contaminant, the atomic ratio of lead to noble metal in the resulting catalyst varies from an unacceptably high amount on the surface to a negligibly low amount within the interior portion of the composite. In the case of a hydrocracking process, one of the principal advantages associated with the use of the novel catalyst of the present invention involves the acquisition of the capability to operate in a selectively stable manner in a high-severity operation. In short, the present invention essentially involves the finding that the addition of a controlled amount of a lead component to a dual function hydrocarbon conversion catalyst containing a Group VIII noble metal component enables performance characteristics of the catalyst to be sharply and materially improved when used in a hydrogen-consuming process.

OBJECTS AND EMBODIMENTS

An object of the present invention is to afford a process for the hydroprocessing of a hydrocarbon, or mixtures of hydrocarbons. A corollary objective is to improve the selectivity and stability of hydroprocessing utilizing a highly active, lead component-containing catalytic composite.

A specific object of my invention resides in the improvement of hydrogen-consuming processes including hydrocracking, hydrorefining, ring-opening for jet fuel production, hydrogenation of aromatic hydrocarbons, desulfurization, denitrification, etc.

Therefore, in one embodiment, the present invention encompasses a hydrocarbon hydroprocess which comprises reacting a hydrocarbon with hydrogen at conditions selected to effect the chemical consumption of hydrogen and in contact with a catalytic composite of a Group VIII noble metal component, a lead component and a porous carrier material. In another embodiment, the operating conditions include a pressure of from 400 to about 5,000 p.s.i.g., an LHSV (defined as volumes of liquid hydrocarbon charge per hour per volume of catalyst disposed in the reaction zone) of from 0.1 to about 10.0, a hydrogen concentration of from 1,000 to about 50,000 scf./Bbl. and a maximum catalyst bed temperature of frame 200° F. to about 900° F.

In another embodiment, the process is further characterized in that the catalytic composite is reduced and sulfided prior to contacting the hydrocarbon feed stream. In still another embodiment, my invention involves a process for hydrogenating a coke-forming hydrocarbon distillate containing di-olefinic and mono-olefinic hydrocarbons, and aromatics, which process comprises reacting said distillate with hydrogen, at a temperature below about 500° F., in contact with a catalytic composite of an alumina-containing refractory inorganic oxide, a Group VIII noble metal component, and recovering an aromatic/mono-olefinic hydrocarbon concentrate substantially free from conjugated di-olefinic hydrocarbons.

Another embodiment affords a catalytic composite comprising s substantially pure crystalline aluminosilicate material, at least about 90.0 percent by weight of which is zeolitic, a Group VIII noble metal component and a lead component.

With respect to the catalytic composite, one embodiment involves a catalyst containing from 0.01 percent to about 2.0 percent by weight of a Group VIII noble metal and a lead component such that the atomic ratio of lead/noble metal is in the range of about 0.05:1 to about 0.9:1. In other embodiments, the catalyst will contain from 0.1 percent to 3.5 percent by weight of a halogen component.

Other objects and embodiments of my invention relate to additional details regarding preferred catalytic ingredients, the concentration of components in the catalytic composite, methods of catalyst preparation, individual operating conditions for use in the various hydrocarbon hydroprocesses, preferred processing techniques and the like particulars which are hereinafter given in the following, more detailed summary of my invention.

SUMMARY OF INVENTION

As hereinabove set forth, the present invention involves the hydroprocessing of hydrocarbons and mixtures of hydrocarbons, utilizing a particular catalytic composite. This catalyst comprises a porous carrier material having combined therewith a Group VIII noble metal component and a lead component; in many applications, the catalyst will also contain a halogen component, and in some applications, an alkali metal or alkaline-earth metal component. Considering first the porous carrier material, it is preferred that it be a porous, adsorptive, high-surface area support having a surface area of about 25 to about 500 square meters per gram. The porous carrier material is necessarily relatively refractory with respect to the operating conditions employed in the particular hydrotreating process, and it is intended to include carrier materials which have traditionally been utilized in dual function hydrocarbon conversion catalysts. In particular, suitable carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silicia-zirconia, etc. When of the amorphous type, the preferred carrier material is a composite of alumina and silica with silica being present in an amount of about 10.0 percent to about 90.0 percent by weight.

In many hydroprocessing applications of the present invention, particularly hydrocracking heavy hydrocarbonaceous material to produce lower-boiling hydrocarbon products, the carrier material will constitute a crystalline aluminosilicate, often referred to as zeolitic in nature. This may be naturally-occurring, or synthetically prepared, and includes mordenite, faujasite, Type A or Type U molecular sieves, etc. When utilized as the carrier material, the zeolitic material may be in the hydrogen form, or in a form which has been treated with multivalent cations.

As hereinabove set forth, the porous carrier material, for use in the process of the present invention, is a refractory inorganic oxide, either alumina in and of itself, or in combination with one of more refractory inorganic oxides, and particularly in combination with silica. When utilized as the sole component of the carrier material, the alumina may be of the gamma-, eta-, or theta-alumina type, with gamma-, or eta-alumina giving the best results. In addition, preferred carrier materials have an apparent bulk density of about 0.30 to about 0.70 g./cc. and surface area characteristics such that the average pore diameter is about 20 to about 300 Angstroms, the pore volume is about 0.10 to about 1.0 milliliters per gram and the surface area is about 100 to about 500 square meters per gram. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed in any desired shape such as spheres, pills, cakes, extrudates, powders, granules, etc., and may further be utilized in any desired size.

When a crystalline aluminosilicate, or zeolitic material, is intended for use as the carrier, it may be prepared in a number of ways. One common way is to mix solutions of sodium silicate, or colloidal silica, and sodium aluminate, and allow these solutions to react to form a solid crystalline aluminosilicate. Another method is to contact a solid inorganic oxide, from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate. This stems from the fact that the method can produce a carrier material of substantially pure crystalline aluminosilicate particles. In employing the term "substantially pure," the intended connotation is an aggregate particle at least 90.0 percent by weight of which is zeolitic. Thus, this carrier is distinguished from an amorphous carrier material, or prior art pills and/or extrudates in which the zeolitic material might be dispersed within an amorphous matrix with the result that only about 40.0 percent to about 70.0 percent by weight of the final particle is zeolitic. The preferred method of preparing the carrier material produces crystalline aluminosilicates of the faujasite modification, and utilizes aqueous solutions of colloidal silica and sodium aluminate. Colloidal silica is a suspension in which the suspended particles are present in very finely divided form—i.e., having a particle size from about 1 to about 500 millimicrons in diameter. The type of crystalline aluminosilicate which is produced is primarily dependent upon the conditions under which crystallization occurs, with the $SiO_2Al_2O_3$ ratio, the $Na_2O/SiO_2$ ratio, the $H_2O/Na_2O$ ratio, temperature and time being the important variables.

After the solid crystalline aluminosilicate has been formed, the mother liquor is separated from the solids by methods such as decantation or filtration. The solids are water-washed and filtered to remove undesirable ions, and to reduce the quantity of amorphous material, are then reslurried in water to a solids concentration of about 5.0 percent to about 5.0 percent. The cake and the water are violently agitated and homogenized until the agglomerates are broken and the solids are uniformly dispersed in what appears to be a colloidal suspension. The suspension is then spray dried by conventional means such as pressuring the suspension through an orifice into a hot, dry chamber. The solid particles are withdrawn from the drying chamber and are suitable for forming into finished particles of desired size and shape. The preferred form of the finished particle is a cylindrical pill, and these may be prepared by introducing the spray-dried particles directly into a pilling machine without the addition of any extraneous lubricant or binder. The pilling machines are adjusted to produce particles having a crushing strength of from 2 to 20 pounds, and preferably from 5 to 15 pounds. The pilled faujasite carrier material, of which at least about 90.0 percent by weight is zeolitic, is activated catalytically by converting the sodium form either to the divalent form, the hydrogen form or mixtures thereof.

One essential constituent of the composite of the present invention is a lead component, and it is a preferred feature of the catalyst used in hydroprocessing according to the present invention, that the lead component is present in the composite in an oxidation state above that of the elemental metal. That is to say, the lead component exists within the catalytic composite in the +2 oxidation state. Accordingly, the lead component will be present in the composite as a chemical compound, such as the oxide, sulfide, halide, etc., wherein the lead is in the required oxidation state, or as a chemical combination with the carrier material in which combination the lead exists in this higher oxidation state.

The lead component may be incorporated into the composite in any suitable manner which effectively disperses the lead component throughout the carrier material. Thus, the incorporation may be accomplished by cogellation or coprecipitation with the porous carrier material, ion exchange with the gelled carrier material of impregnation with the carrier material, either after or before it is dried and calcined. It is to be noted that is intended to include within the scope of the present invention all conventional methods for incorporating a metallic component in a catalytic composite and the particular method of incorporation used is not deemed to be an essential feature of the present invention. One method of incorporating the lead component into the catalytic composite involves coprecipitating the lead component during the preparation of the carrier material. This method typically involves the addition of a suitable soluble lead compound to the inorganic oxide hydrosol with a suitable gelling agent and dropping the resultant mixture into an oil bath maintained at elevated temperatures. The droplets remain in the oil bath until they set to form hydrogel spheres. The spheres are withdrawn from the oil bath and subjected to specific aging treatments in oil and in an ammoniacal solution. The aged spheres are washed and dried at a temperature of about 200° F. to 400° F., and thereafter calcined at an elevated temperature of about 850° F. to about 1300° F. After drying and calcining the gelled carrier material, there is obtained an intimate combination of alumina and lead oxide. A preferred method of incorporating the lead component into the catalytic composite involves the utilization of a soluble, decomposable compound of lead to impregnate the porous carrier material. In general, the solvent used in this impregnation step is selected on the basis of the capability to dissolve the desired lead compound, and is preferably an aqueous, or alcoholic solution. Thus, the lead component may be added to the carrier material by commingling the latter with a solution of a suitable lead salt or suitable compound of lead such as lead acetate, lead basic acetate, lead bromate, lead bromide, lead chlorate, lead perchlorate, lead chloride, lead citrate, lead ethylsulfate, lead formate, lead nitrate. In general, the lead component can be impregnated either prior to, simultaneously with, or after the Group VIII noble metal component is added to the carrier material. However, I have found that excellent results are obtained when the lead component is impregnated simultaneously with the Group Viii noble metal component. In fact, I have determined that a preferred impregnation solution contains chloroplatinic acid, nitric acid and lead nitrate. Following the impregnation step, the resulting composite is dried and calcined.

Regardless of which lead compound is used in the impregnation step, it is important that the lead component be uniformly distributed throughout the carrier material. It is preferred to use a volume ratio of impregnation solution to carrier material of at least 1.5:1 and preferably about 2:1 to about 10:1, or more, and to maintain the pH of the solution in the range of 1.0 to about 7.0 Similarly, it is preferred to use a relatively long contact time, during the impregnation step, ranging from about one-fourth hour up to about one-half hour or more before drying to remove excess solvent in order to insure a high dispersion of the lead component of the carrier material. The carrier material is, likewise, preferably constantly agitated during this impregnation step.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium, and iridium. The Group VIII noble metal component, for example platinum, may exist within the final catalytic composite as a compound such as an oxide, sulfide, halide, etc., or in an elemental state. The Group VIII noble metal component generally comprises about 0.01 percent to about 2.0 percent by weight of the final composite, calculated on an elemental basis. Excellent results are obtained when the catalyst contains about 0.05 percent to about 1.0 percent by weight of the Group VIII noble metal. In addition to platinum, another particularly preferred Group VIII noble metal component is palladium, or a compound of palladium.

The Group VIII noble metal component may be incorporated within the catalytic composite in any suitable manner including coprecipitation or cogellation with the carrier material, ion-exchange or impregnation. A preferred method of preparation involves the utilization of a water-soluble compound of a Group VIII noble metal component in an impregnation technique. Thus, a platinum component may be added to the carrier material by commingling the latter with an aqueous solution of chlorplatinic acid. Other water-soluble compounds or platinum may be employed, and include ammonium chloroplatinate, platinum chloride, dinitro diamino platinum, etc. The use of a platinum chloride compound, such as chloroplatinic acid, is preferred since it facilitates the incorporation of both the platinum component and at least a minor quantity of the halogen component in a single step. In addition, it is generally preferred to impregnate the carrier material after it has been calcined in order to minimize the risk of washing away the valuable Group VIII noble metal compounds; however, in some instances, it may prove advantageous to impregnate the carrier material when it exists in a gelled state. Following impregnation, the composite will generally be dried at a temperature of about 200° F. to about 400° F., for a period of from 2 to about 24 hours, or more, and finally calcined at a temperature of about 700° F. to 1100° F., in an atmosphere of air, for a period of about 0.5 to about 10 hours.

Although not essential to successful hydroprocessing in all cases, in fact detrimental in some, a halogen component may be incorporated into the catalytic composite. Accordingly, a preferred catalytic composite, for use in the present process, comprises a combination of a Group VIII noble metal component, a lead component and a halogen component. Although the precise form of the chemistry of the association of the halogen component with the carrier material and metallic components is not accurately known, it is customary in the art to refer to the halogen component as being combined with the carrier material, or with other ingredients of the catalyst. The combined halogen may be either fluorine, chlorine, iodine, bromine, or mixtures thereof. Of these, fluorine and particularly chlorine are preferred for the hydrocarbon hydroprocesses encompassed by the present invention. The halogen may be added to the carrier material in any suitable manner, and either during preparation of the carrier or before, or after the addition of the other components. For example, the halogen may be added at any stage in the preparation of the carrier material, or to the calcined carrier material, as an aqueous solution of an acid such as hydrogen fluoride, hydrogen chloride, hydrogen bromide, hydrogen iodine, etc. The halogen component or a portion thereof may be composited with the carrier material during the impregnation of the latter with the Group VIII noble metal component. The inorganic oxide hydrosol, which is typically utilized to form an amorphous carrier material, may contain halogen and thus contribute at least a portion of the halogen component to the final composite. The quantity of halogen is such that the final catalytic composite contains about 0.1 percent to about 3.5 percent by weight, and preferably from about 0.5 percent to about 1.5 percent, calculated on an elemental basis.

Regarding the amount of the lead component contained in the composite, I have found it essential to fix the amount of the lead component as a function of the amount of the Group VIII noble metal component contained in he composite. More specifically, I have observed that the beneficial interaction of the lead component with the Group VIII noble metal component is only obtained when the lead component is present, on an atomic basis, in an amount less than the platinum group component. Quantitatively, the amount of the lead component is preferably sufficient to provide an atomic ratio of lead to noble metal of about 0.05:1 to about 0.9:1, with best results obtained at an atomic ratio of about 0.1:1 to about 0.75:1. The criticality associated with this atomic ratio limitation is apparent when an attempt is made to convert hydrocarbons with a catalyst having an atomic ratio of lead to noble metal of 1:1. In this latter case, I observed substantial deactivation of the noble metal component by the lead component. Accordingly, it is an essential feature of the present invention that the amount of lead component be chosen as a function of the amount of the noble metal component in order to insure that the atomic ratio of these components is within the stated range. Specific examples of especially preferred catalytic composites are as follows: (1) a catalytic composite comprising 1.0 wt. percent platinum and 0.5 wt. percent lead; (2) a catalytic composite comprising 0.75 wt. percent platinum and 0.2 wt. percent lead; (3) a catalytic composite comprising 0.375 wt. percent platinum and 0.10 wt. percent lead; (4) a catalytic composite comprising 0.2 wt. percent platinum and 0.1 wt. percent lead; and, (5) a catalytic composite comprising 0.5 wt. percent platinum, and 0.2 wt. percent lead.

The following specific illustrations of one method of catalytic preparation is believed to result in a composite in which the lead component exists in an oxidation state above that of the elemental metal. An alumina carrier material comprising one-sixteenth inch spheres was prepared in the manner following: an aluminum hydroxyl chloride sol was formed by dissolving substantially pure aluminum pellets in a hydrochloric acid solution, adding hexamethylene-tetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 percent by weight of combined chloride. Additional details regarding this method of preparing the carrier material are given in U.S. Pat. No 2,620,314. —

The resulting gamma-alumina particles were then contacted with an impregnation solution containing chloroplatinic acid and lead nitrate in an amount sufficient to result in a final composite containing 0.375 percent by weight of platinum and 0.1 percent by weight of lead, calculated on an elemental basis. In addition, the impregnating solution contained nitric acid in an amount equivalent to about 3.0 percent by weight of the alumina particles. In order to insure uniform distribution of both metallic components throughout the carrier material, the impregnation step was performed by adding the carrier material particles to the impregnation mixture with constant agitation. In addition, the volume of the solution was twice the volume of the carrier material particles. The impregnation mixture was maintained in contact with the carrier material particles for a period of about one-half hour at a temperature of about 70° F. Thereafter, the temperature of the impregnation mixture was raised to about 225° F. and the excess solution was evaporated over a period of about 1 hour. The resulting dried particles were then subjected to a calcination treatment in an air atmosphere at a temperature of about 925° F. for about 1 hour. The calcined spheres were then contacted with an air stream containing $H_2O$ and HCl in a mole ratio of about 40:1 for about 4 hours at 975° F. in order to adjust the halogen content of the catalyst particles to a value of about 0.90 percent by weight.

The resulting catalyst particles were analyzed and found to contain, on an elemental basis, about 0.375 wt. percent platinum, about 0.1 wt. percent lead, and about 0.85 wt. percent chloride. On an atomic basis, the ratio of lead to platinum was 0.25:1.

Thereafter, the catalyst particles were subjected to a dry prereduction treatment by contacting them with a substantially pure hydrogen stream containing less than 20 vol. p.p.m. $H_2O$ at a temperature of about 1,000° F., a pressure slightly above atmospheric and a flow rate of the hydrogen stream through the catalyst particles corresponding to a gas hourly space velocity of about 720. This prereduction step was for a duration of about 1 hour.

When used in many of the hydrogen-consuming processes hereinbefore described, the foregoing quantities of metallic components will be combined with a carrier material of alumina and silica, wherein the silica concentration is 10.0 percent to about 90.0 percent by weight. In those processes wherein the acid function of the catalytic composite must necessarily be attenuated, the metallic components will be combined with a carrier material consisting essentially of alumina. In this latter situation, a halogen component is often not combined with the catalytic composite, and, the inherent acid function of Group VIII noble metals is further attenuated through the addition of from 0.01 percent to about 1.5 percent by weight of an alkalinous metal component.

One such process, in which the acid function of the catalyst employed must necessarily be attenuated, is the process wherein an aromatic hydrocarbon is hydrogenated to produce the corresponding cycloparaffin. Specifically, a benzene-concentrate is often used as the starting material for the production of cyclohexane primarily to satisfy the demand therefor in the manufacture of nylon. In order to avoid ring-opening which results in loss of both the benzene charge and the cyclohexane product, an alkalinous metal component is combined with the catalytic composite in an amount of from 0.01 percent to about 1.5 percent by weight. This component is selected from the group of lithium, sodium, potassium, rubidium, cesium, barium, strontium, calcium, magnesium, beryllium, mixtures of two or more, etc. In general, more advantageous results are achieved through the use of the alkali metal, particularly lithium and/or potassium.

In those instances where a halogen component is utilized in the catalyst, it has been determined that more advantageous results are obtained when the halogen content of the catalyst is adjusted during the calcination step through the inclusion of a halogen, or a halogen-containing compound in the air atmosphere. In particular, when the halogen component of the catalyst is chlorine, for example, it is preferred to use a mole ratio of water to hydrochloric acid of about 20:1 to about 100:1 during at least a portion of the calcination step in order to adjust the final chloride content of the composite to a range of about 0.5 to about 1.5 percent by weight.

Prior to its use, in the hydroprocessing of hydrocarbons, the resultant calcined catalytic composite may be subjected to a substantially water-free reduction technique. This technique is designed to insure a uniform and finely divided dispersion of the metallic components throughout the carrier material. Preferably, substantially pure and dry hydrogen (i.e., less than about 30.0 vol. p.p.m. of water) is employed as the reducing agent. The calcined catalyst is contacted at a temperature of about 800° F. to about 1200° F., and for a period of time of about 0.5 to about 2 hours. This reduction technique may be performed *in situ* as part of a startup sequence provided precautions are observed to predry the unit to a substantially water-free state.

Again, with respect to effecting hydrogen-consuming reactions, the process is generally improved when the reduced composite is subjected to a presulfiding operation designed to incorporate from about 0.05 to about 0.50 percent by weight of sulfur, on an elemental basis, in the catalytic composite. This presulfiding treatment takes place in the presence of hydrogen and a suitable sulfur-containing compound including hydrogen sulfide, lower molecular weight mercaptans, organic sulfides, etc. The procedure constitutes treating the reduced catalyst with a sulfiding gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. up to about 1000° F.

According to the present invention, the hydrocarbon charge stock and hydrogen are contacted with a catalyst or the type described above in a hydrocarbon conversion zone. The particular catalyst employed is dependent upon the characteristics of the charge stock as well as the desired end result. The contacting may be accomplished by using the catalyst in a fixed-bed system, a moving-bed system, a fluidized-bed system, or in a batch-type operation; however, in view of the risk of attrition losses of the valuable catalyst, it is preferred to use the fixed-bed system. Furthermore, it is well known that a fixed-bed catalytic system offers many operational advantages. In this type of system, a hydrogen-rich gas and the charge stock are preheated by any suitable heating means to the desired temperature, and are then passed into a conversion zone containing the fixed-bed of the catalytic composite. It is understood, of course, that the conversion zone may be one or more separate reactors having suitable means therebetween to insure that the desired conversion temperature is maintained at the entrance of each reactor. It is also to be noted that the reactants may contact the catalyst bed in either upward, downward, or radial flow fashion, with the latter being preferred. Additionally, the reactants may be in the liquid phase, a mixed liquid-vapor phase, or a vapor phase when they contact the catalyst.

The operating conditions imposed upon the reaction zones are dependent upon the particular hydroprocessing being effected. However, these operating conditions will include a pressure from about 400 to about 5,000 p.s.i.g., a liquid hourly space velocity (LHSV) of about 0.1 to about 10.0, and a hydrogen concentration within the range of about 1,000 to about 50,000 standard cubic feet per barrel. In view of the fact that the reactions being effected are exothermic in nature, an increasing temperature gradient is experienced as the hydrogen and feed stock traverse the catalyst bed. For any given hydrogen-consuming process, it is desirable to maintain the maximum catalyst bed temperature below about 900° F., which temperature is virtually identical to that conveniently measured at the outlet of the reaction zone. Hydrogen-consuming processes are conducted at a temperature in the range of about 200° F. at about 900° F., and it is intended herein that the stated temperature of operation alludes to the maximum catalyst bed temperature. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydrocarbon hydroprocesses encompassed by the present invention, and especially where hydrocracking a heavy hydrocarbonaceous material to produce lower-boiling hydrocarbon products, that portion of the normally liquid product effluent boiling above the end point of the desired product will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other individual process details will be given in the following detailed description of several of the hydro carbon hydroprocesses to which the present invention is applicable. These will be presented by way of examples given in conjunction with commercially

EXAMPLE I

In this example, the present invention is illustrated as applied to the hydrogenation of aromatic hydrocarbons such as benzene, toluene, the various xylenes, naphthalenes, etc., to form the corresponding cyclic paraffins. When applied to the hydrogenation of aromatic hydrocarbons, which are contaminated by sulfurous compounds, primarily thiophenic compounds, the process is advantageous in that it affords 100.0 percent conversion without the necessity for the substantially complete prior removal of the sulfur compounds. The corresponding cyclic paraffins, resulting from the hydrogenation of aromatic nuclei, include compounds such as cyclohexane, mono-, di-, tri-, substituted cyclohexanes, decahydronaphthalene, tetra-hydronaphthalene, etc., which find widespread use in a variety of commercial industries in the manufacture of nylon, as solvents for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal, or iso-paraffinic components, and the naphthenes contained therein. Benzene is readily recovered from the selected solvent by way of distillation, and in a purity of 99.0 percent or more. Heretofore, the hydrogenation of aromatic hydrocarbons, for example benzene, has been effected with a nickle-containing catalyst at hydrogenation conditions. This is extremely disadvantageous in many respects, and especially from the standpoint that nickel is quite sensitive to the minor quantity of sulfurous compounds which may be contained in the benzene concentrate. In accordance with the present process, the benzene is hydrogenated in contact with a nonacidic catalytic composite containing 0.01 percent to about 2.0 percent by weight of a Group VIII noble metal component, a lead component and from about 0.01 percent to about 1.5 percent by weight of an alkalinous metal component. Operating conditions include a maximum catalyst bed temperature in the range of about 200° F. to about 800° F., a pressure of from 500 to about 2,000 p.i.s.g., a liquid hourly space velocity of about 1.0 to about 10.0 and a hydrogen concentration in an amount sufficient to yield a mole ratio of hydrogen to cyclohexane, in the product effluent form the last reaction zone, not substantially less than about 4.0:1. Although not essential, one preferred operating technique involves the use of three reaction zones, each of which contains approximately one-third of the total quantity of catalyst employed. The process is further facilitated when the total fresh benzene is added in three approximately equal portions, one each to the inlet of each of the three reaction zones.

The catalyst utilized is a substantially halogen-free alumina carrier material combined with about 0.20 percent by weight of lead, 0.40 percent by weight of platinum, and about 0.50 percent of lithium, all of which are calculated on the basis of the elemental metals. The hydrogenation process will be described in connection with a commercially scaled unit having a total fresh benzene feed capacity of about 1,950 Bbl./day. Makeup gas in an amount of about 1,590.8 mols/hr. (1.066 mols/hr. of hydrogen) is admixed with 173.62 mols/hr. (119.40 mols/hr. of cyclohexane) or a recycle stream, the mixture being at a temperature of about 119° F., and further mixed with 113.98 mols/hr. (689.8 Bbl./day) of the fresh benzene feed; the final mixture constitutes the total charge to the first reaction zone.

Following suitable heat exchange with various hot effluent streams, the total feed to the first reaction zone is at a temperature of 290° F. and a pressure of 490 p.i.s.g. The reaction zone effluent is at a temperature of 480° F. and a pressure of about 480 p.s.i.g. The total effluent from the first reaction zone is utilized as a heat-exchange medium, in a stream generator, whereby the temperature is reduced to a level of about 330 ° F. The cooled effluent is admixed with about 115.63 moles per hour (669.8 Bbl./day) of fresh benzene feed, at a temperature of 100° F.; the resulting temperature is 290° F., and the mixture enters the second reaction zone at a pressure of about 470 p.s.i.g. The second reaction zone effluent is withdrawn at a pressure of 460 p.s.i.g. and a temperature of 472° F. Following its use as a heat-exchange medium, the temperature is reduced to 320° F.; the effluent is admixed with 91.08 mols/hr. (551.2 Bbl.day) of fresh benzene feed and the mixture enters the third reaction zone at a pressure of 450 p.s.i.g. and a temperature of 290° F. The third reaction zone effluent is at a temperature of about 429° F. and a pressure of about 440 p.s.i.g. Through utilization as a heat-exchange medium, the temperature is reduced to a level of about 226° F., and subsequently reduced to a level of about 120° F. using an air-cooled condenser. The cooled third reaction zone effluent is introduced into a high pressure separator, at a pressure of about 400 p.s.i.g.

A hydrogen-rich vaporous phase is withdrawn from the high pressure separator and recycled by way of compressive means, at a pressure of about 520 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at an operating pressure of about 260 p.s.i.g., a top temperature of about 160° F. and a bottom temperature of about 430° F. The cyclohexane product is withdrawn from the stabilizer as a bottoms stream, the overhead stream being vented to fuel. The cyclohexane concentrate is recovered in an amount of about 321.33 moles per hour, of which only about 0.16 moles per hour constitutes other hexanes. In brief summation, of the 25,161 pounds per hour of fresh benzene feed, 27,055 pounds per hour of cyclohexane product is recovered.

EXAMPLE II

Another hydrocarbon hydroprocessing scheme, to which the present invention is applicable, involves the hydrorefining of coke-forming hydrocarbon distillates. These hydrocarbon distillates are generally sulfurous in nature, and contain monoolefinic, di-olefinic and aromatic hydrocarbons. Through the utilization of a catalytic composite comprising both a lead component and a Group VIII noble metal component, increased selectively and stability of operation is obtained; selectively is most noticeable with respect to the retention of aromatics, and in hydrogenating conjugated di-olefinic and mono-olefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which when removed, enhance the value of the distillate fraction for further processing. Frequently, it is intended that these charge stocks be substantially desulfurized, saturated to the extent necessary to remove the conjugated di-olefins, while simultaneously retaining the aromatic hydrocarbons. When subjected to hydrorefining for the purpose of removing the contaminating influences, there is encountered difficulty in effecting the desired degree of reaction due to the formation of coke and other carbonaceous material.

As utilized herein, "hydrogenating" is intended to be synonymous with "hydrorefining." The purpose is to provide a highly selective and stable process for hydrogenating coke-forming hydrocarbon distillates, and this is accomplished through the use of a fixed-bed catalytic reaction system utilizing a catalyst comprising a lead component and a Group VIII noble metal component. There exist two separate, desirable routes for the treatment of coke-forming distillates, for example a pyrolysis naphtha byproduct. One such route is directed toward a product suitable for use in certain gasoline blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated di-olefins, the selectivity afforded restricts the hydrogenation to produce mono-olefins, and, with respect to the styrenes, for example, the hydrogenation is inhibited to produce alkyl benzenes without "ring" saturation. The selectivity is accomplished with a minimum of polymer formation either to "gums," or lower molecular weight polymers which would necessitate a rerunning of the product before blending to gasoline would be feasible. Some fresh charge stocks are sufficiently low in mercaptan sulfur content that direct gasoline blending may be considered, although a mild treatment for mercaptan sulfur removal might be necessary. Such considerations are generally applicable to foreign markets, particularly European, where olefinic and sulfur-containing gasolines are not too objectionable. It must be noted that the sulfurous compounds, and the mono-olefins, whether virgin, or products of di-olefin partial saturation, are unchanged in the single, or first-stage reaction zone. Where, however, the desired end result is aromatic hydrocarbon retention, intended for subsequent extraction, the two-stage route is required. The mono-olefins must be substantially saturated in the second stage to facilitate aromatic extraction by way of currently utilized methods. Thus, the desired necessary hydrogenation involves saturation of the mono-olefins, as well as sulfur removal, the latter required for an acceptable ultimate aromatic product. Attendant upon this is the necessity to avoid even partial saturation of aromatic nuclei.

With respect to one catalytic composite, its principal function involves the selective hydrogenation of conjugated di-olefinic hydrocarbons to mono-olefinic hydrocarbons. This particular catalytic composite possess unusual stability notwithstanding the presence of sulfurous compounds in the fresh charge stock. The catalytic composite comprises an alumina-containing refractory inorganic oxide, a lead component, a Group VIII noble metal component and an alkali-metal component, the latter being preferably potassium and/or lithium. It is especially preferred, for use in this particular hydrocarbon hydroprocessing scheme, that the catalytic composite by substantially free from any "acid-acting" propensities. The catalytic composite, utilized in the second reaction zone for the primary purpose of effecting the destructive conversion of sulfurous compounds into hydrogen sulfide and hydrocarbons, is a composite of an alumina-containing refractory inorganic oxide, a Group VIII noble metal component and a lead component. Through the utilization of a particular sequence of processing steps, and the use of the foregoing described catalytic composites, the formation of high molecular weight polymers and copolymers is inhibited to a degree which permits processing for an extended period of time. Briefly, this is accomplished by initiating the hydrorefining reactions at temperatures below about 500° F., at which temperature the coke-forming reactions are not promoted. The operating conditions within the second reaction zone are such that the sulfurous compounds are removed without incurring the detrimental polymerization reactions otherwise resulting were it not for the saturation of the conjugated di-olefinic hydrocarbons within the first reaction zone.

The hydrocarbon distillate charge stock, for example, a light naphtha byproduct from a commercial cracking unit designed and operated for the production of ethylene, having a gravity of about 34.0 °API, a bromine number of about 35.0, a diene value of about 17.5 and containing about 1,600 p.p.m. by weight of sulfur and 75.9 vol. percent aromatic hydrocarbons, is admixed with recycled hydrogen. This light naphtha coproduct has an initial boiling point of about 164° F. and an end boiling point of about 333° F. The hydrogen concentration is within the range of from about 1,000 to about 10,000 scf./Bbl., and preferably in the narrower range of from 1,500 to about 6,000 scf./Bbl. The charge stock is heated to a temperature such that the maximum catalyst temperature is in the range of from about 200° F. to about 500° F., by way of heat exchange with various product effluent streams, and is introduced into the first reaction zone at an LHSV in the range of about 0.5 to about 10.0. The reaction zone is maintained at a pressure of from 400 to about 1,000 p.s.i.g., and preferably at a level in the range of from 500 p.s.i.g. to about 900 p.s.i.g.

The temperature of the product effluent from the first reaction zone is increased to a level above about 500° F., and preferably to result in a maximum catalyst temperature in the range of 600° F. to 900° F. When the process is functioning efficiently, the diene value of the liquid charge entering the second catalytic reaction zone is less than about 1.0 and often less than about 0.3. The conversion of nitrogenous and sulfurous compounds, and the saturation of mono-olefins, contained within the first zone effluent, is effected in the second zone. The second catalytic reaction zone is maintained under an imposed pressure of from about 400 to about 1,000 p.s.i.g., and preferably at a level of from about 500 to about 900 p.s.i.g. The two-stage process is facilitated when the focal point for pressure control is the high pressure separator serving to separate the product effluent from the second catalytic reaction zone. It will, therefore, be maintained at a pressure slightly less than the first catalytic reaction zone, as a result of fluid flow through the system. The LHSV through the second reaction zone is about 0.5 to about 10.0, based upon fresh feed only. The hydrogen concentration will be in a range of from 1,000 to about 10,000 scf./Bbl., and preferably from about 1,000 to about 8,000 scf/Bbl. Series-flow through the entire system is facilitated when the recycle hydrogen is admixed with the fresh hydrocarbon charge stock. Makeup hydrogen, to supplant that consumed in the overall process, may be introduced from any suitable external process, but is preferably introduced into the system by way of the effluent line from the first catalytic reaction zone to the second catalytic reaction zone.

With respect to the naphtha boiling range portion of the product effluent, the sulfur concentration is about 0.1 p.p.m., the aromatic concentration is about 75.1 percent by volume, the bromine number is less than about 0.3 and the diene value is essentially "nil."

With charge stocks having exceedingly high diene values, a recycle diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle diluent may be lessened, thereby decreasing the combined liquid feed ratio.

Another so-called pyrolysis gasoline, boiling from 132° F. to 350° F., having a gravity of about 45.0 °API, containing 700 p.p.m. by weight of sulfur, 67.5 percent by volume of aromatics, and having a bromine number of 60 and a diene value of 50, is initially processed in a first reaction zone containing a catalytic composite of alumina, 0.5 percent by weight of lithium, 0.20 percent by weight of lead and 0.375 percent by weight of palladium calculated as the elements. The fresh feed charge rate is 2,614 Bbl./day, and this is admixed with 3,921 Bbl./day of the normally liquid diluent. Based upon fresh feed only, the LHSV is 1.8 and the hydrogen circulation rate is 2,500 scf./Bbl. The charge is raised to a temperature of about 260° F., and enters the first reaction zone at a pressure of about 820 p.s.i.g. The product effluent emanates from the first reaction zone at a pressure of about 810 p.s.i.g. and a temperature of about 360° F. The effluent is admixed with about 672 scf./Bbl. of makeup hydrogen, and the temperature is increased to a level of about 525° F., the heated stream is introduced into the second reaction zone under a pressure of about 780 p.s.i.g. The LHSV, exclusive of the recycle diluent, is 2.0, and the hydrogen circulation rate is about 3,750. The second reaction zone contains a catalyst of a composite of alumina, 0.50 percent by weight of platinum and 0.25 percent by weight of lead. The reaction product effluent is introduced, following its use as a heat-exchange medium and further cooling, to reduce its temperature from 600° F. to a level of 100° F., into a high-pressure separator at a pressure of about 750 p.s.i.g. The normally liquid stream from the cold separator is introduced into a reboiled stripping column for hydrogen sulfide removal and depentanization. The hydrogen sulfide stripping column functions at conditions of temperature and pressure required to concentrate a $C_6$ to $C_9$ aromatic stream as a bottoms fraction. With respect to the overall product distribution, only 0.17 percent by weight of butanes and lighter hydrocarbons is indicated in the stripper overhead. With respect to the desired product, the aromatic concentration is 67.0 percent, the sulfur concentration is less than 1.0 p.p.m. by weight, and the diene value is essentially "nil."

EXAMPLE III

This illustration of a hydrocarbon hydroprocessing scheme is one which involves hydrocracking heavy hydrocarbonaceous material into lower-boiling hydrocarbon products. In this instance, the preferred catalysts contain a lead component and a Group VIII noble metal component combined with a crystalline aluminosilicate carrier material, preferably faujasite, and still more preferably one which is at least 90.0 percent by weight zeolitic. The Group VIII noble metal component is preferably platinum and/or palladium; and, in some instances, a halogen component may be combined therewith, particularly fluorine and/or chlorine.

Most of the virgin stocks, intended for hydrocracking, are contaminated by sulfurous compounds and nitrogenous compounds, and, in the case of the heavier charge stocks, various metallic contaminants, insoluble asphalts, etc. Contaminated charge stocks are generally hydrorefined in order to prepare a charge suitable for hydrocracking. Thus, the catalytic process of the present invention can be beneficially utilized as the second stage of a two-stage process, in the first stage of which the fresh feed is hydrorefined.

Hydrocracking reactions are generally effected at elevated pressures in the range of about 800 to about 5,000 p.s.i.g., and preferably at some intermediate level of 1,000 to about 3,500 p.s.i.g. Liquid hourly space velocities of about 0.25 to about 10.0 will be suitable, the lower range generally reserved for the heavier stocks. The hydrogen circulation rate will be at least about 3,000 scf/Bbl., with an upper limit of about 50,000 scf/Bbl., based upon fresh feed. For the majority of feedstocks, hydrogen concentrations in the range of 5,000 to 20,000 scf/Bbl. will suffice. With respect to the LHSV, it is based upon fresh feed, notwithstanding the use of recycle liquid providing a combined liquid feed ratio in the range of about 1.25 to about 6.0. The operating temperature again alludes to the temperature of the catalyst within the reaction zone, and is in the range of about 400° F. to about 900° F. Since the principal reactions are exothermic in nature, the increasing temperature gradient, experienced as the charge stock traverses the catalyst bed, results in an outlet temperature higher than that at the inlet to the catalyst bed. The maximum catalyst temperature should not exceed 900° F., and it is generally a preferred technique to limit the temperature increase to 100° F. or less.

Although amorphous composites of alumina and silica, containing from about 10.0 percent to about 90.0 percent by weight of the latter, are suitable for use in the catalytic composite employed in the present process, a preferred carrier material constitutes a crystalline aluminosilicate, preferably faujasite, of which at least about 90.0 percent by weight is zeolitic. This carrier material, and a method of preparing the same, have hereinbefore been described. The Group VIII noble metal component is generally present in an amount within the range of about 0.01 percent to about 2.0 percent by weight, and may exist within the composite as a compound such as an oxide, sulfide, halide, etc. Another possible constituent of the catalyst is a halogen component, either fluorine, chlorine, iodine, bromine, or mixtures thereof. Of these, it is preferred to utilize a catalyst containing fluorine and/or chlorine. The halogen component will be composited with the carrier material in such a manner as results in a final composite containing about 0.1 percent to about 3.5 percent by weight of halogen, calculated on an elemental basis.

A specific illustration of this hydrocarbon hydroprocessing technique involves the use of a catalytic composite of about 0.4 percent by weight of platinum, 0.7 percent by weight of combined chlorine, and 0.25 percent by weight of lead combined with a crylstalline aluminosilicate material of which about 90.9 percent by weight constitutes faujasite. This catalyst is intended for utilization in the conversion of 32,000 Bbl./day of a blend of light and heavy gas oils to produce maximum quantities of a heptane-385° F. gasoline boiling range fraction. The charge stock has a gravity of 28.9 °API, contains 0.17 percent by weight of sulfur (1,700 p.p.m.) and 767 p.p.m. by weight of nitrogen, and has an initial boiling point of 368° F., a 50 percent volumetric distillation temperature of 646° F. and an end boiling point of 840° F. The charge stock is initially subjected to a cleanup operation at maximum catalyst temperature of 750° F., a combined feed ratio of 1.0 (no liquid recycle), an LHSV of 1.45 with a hydrogen circulation rate of about 10,000 scf./Bbl. The pressure imposed upon the catalyst within the reaction zone is about 1,800 p.s.i.g. This particular unit is designed to function in series flow; thus, the entire effluent from the cleanup zone, following heat exchange to lower its temperature to 700° F., is passed into the hydrocracking reaction zone containing the lead/platinum catalyst. The pressure imposed upon the second reaction zone is about 1,750 p.s.i.g., and hydrogen quench is employed in an amount of about 2,000 scf/Bbl. to maintain a temperature increase of 50° F. The feed to the hydrocracking reaction zone is admixed with about 14,720 Bbl./day of a liquid recycle stream to provide a combined liquid feed ration of about 1.5; the liquid hourly space velocity is 0.71. Following separation of the product effluent from the second reaction zone, to concentrate the desired gasoline boiling range fraction, the remaining 385° F. plus normally liquid material is recycled to the inlet of the second reaction zone, thus providing a combined liquid feed ratio thereto of about 1.5. In the following table, there is indicated the product yield and distribution of this process. With respect to Stage I, the yields are given in wt. percent. With respect to the Stage II effluent, the normally gaseous hydrocarbons, ammonia and hydrogen sulfide are given in terms of wt. percent, while butanes and heavier hydrocarbons are presented in vol. percent. With respect to the the first reaction zone, the hydrogen consumption is 1.37 percent by weight of the fresh feed (801 scf/Bbl.), and for the hydrocracking reaction zone, 1.51 percent by weight of the fresh feed charge stock, or 881 scf./Bbl.

TABLE: Hydrocracking Product Yield and Distribution

| Component | Stage I | Stage II |
| --- | --- | --- |
| Ammonia | 0.09 | 0.09 |
| Hydrogen Sulfide | 0.18 | 0.18 |
| Methane | 0.15 | 0.28 |
| Ethane | 0.23 | 0.51 |
| Propane | 0.34 | 3.73 |

TABLE—Continued

| Component | Stage I | Stage II |
|---|---|---|
| Butanes | 0.62 | 19.76 |
| Pentanes | 0.52 | 14.72 |
| Hexanes | 0.67 | 16.91 |
| Heptane Reptane - 385° F. | 7.04 | 70.58 |
| 385° F.-plus | 91.53 | |

With respect to the butane product and pentane product, the former is indicated as being about 67.0 percent iso-butanes, while the latter constitutes about 93.0 percent iso-pentanes. An analysis of the combined pentane/hexane fraction indicates a gravity of 82.6° API, a clear research octane rating of 84.0 and a leaded research octane rating of 98.0; it will be noted that this constitutes an excellent blending component for motor fuel. The desired heptane-385° F. product indicates a gravity of 52.2° API, a clear research octane rating of 66.0 and a leaded research octane rating of 84.0. This gasoline boiling range fraction constitutes about 42.0 percent by volume paraffins, 37.0 percent by volume naphthenes and 21.0 percent by volume aromatic hydrocarbons. It will be recognized that this gasoline boiling range fraction constitutes an excellent charge stock for a catalytic reforming unit to improve the motor fuel characteristics thereof.

The foregoing specification, and particularly the examples, indicates the method by which the present invention is effected and the benefits to be afforded through the utilization thereof.

I claim as my invention:

1. A process for hydrocracking a hydrocarbonaceous charge stock into lower molecular weight hydrocarbons which comprises reacting said charge stock with hydrogen, at a temperature of about 400° F. to 900° F., a pressure of about 800 to 5000 p.s.i.g., a liquid hourly space velocity of about 0.25 to 10.0 and a hydrogen concentration of about 3,000 to 50,000 scf./Bbl., in contact with a catalytic composite of a porous carrier material, a lead component and from 0.01 to about 2.0 wt. percent of a Group VIII noble metal component, the atomic ratio of lead to said noble metal being in the range of about 0.05:1 to about 0.9:1, said weight percentage being on an elemental basis.

2. The process of claim 1 further characterized in that said Group VIII noble metal is platinum or palladium.

3. The process of claim 2 further characterized in that said catalytic composite is reduced and sulfided prior to contacting said charge stock.

4. The process of claim 1 further characterized in that said catalytic composite contains from about 0.1 percent to about 1.5 percent by weight of a halogen component, on an elemental basis.

5. The process of claim 2 further characterized in that said carrier material is a crystalline aluminosilicate.

6. The process of claim 2 further characterized in that said carrier material is an amorphous refractory inorganic oxide.

7. A catalytic composite comprising a substantially pure crystalline aluminosilicate carrier material, at least about 90.0 percent by weight of which is zeolitic, a lead component, and about 0.01 to about 2.0 wt. percent of a Group VIII noble metal component, the atomic ratio of lead to said noble metal being in the range of about 0.05:1 to about 0.9:1.

8. The catalytic composite of claim 7 further characterized in that said Group VIII noble metal component is a platinum component.

9. The catalytic composite of claim 7 further characterized in that said crystalline aluminosilicate is faujasite.